US008451806B2

(12) United States Patent
Kumar et al.

(10) Patent No.: US 8,451,806 B2
(45) Date of Patent: May 28, 2013

(54) SYSTEMS AND METHODS FOR PINGING A USER'S INTRANET IP ADDRESS

(75) Inventors: Arkesh Kumar, Santa Clara, CA (US); James Harris, San Jose, CA (US)

(73) Assignee: Citrix Sysrems, Inc., Fort Lauderdale, FL (US)

( * ) Notice: Subject to any disclaimer, the term of this patent is extended or adjusted under 35 U.S.C. 154(b) by 597 days.

(21) Appl. No.: 11/465,963

(22) Filed: Aug. 21, 2006

(65) Prior Publication Data

US 2008/0043761 A1 Feb. 21, 2008

(51) Int. Cl.
H04W 4/00 (2009.01)
H04L 12/66 (2006.01)
H04L 12/28 (2006.01)
G06F 9/00 (2006.01)

(52) U.S. Cl.
USPC ............ 370/338; 370/356; 370/392; 709/220

(58) Field of Classification Search
USPC ...... 370/351, 389, 392, 393, 395.1, 396–399, 370/395.2–395.32, 395.5, 395.6, 401; 709/223–225, 217, 218, 238–242, 249
See application file for complete search history.

(56) References Cited

U.S. PATENT DOCUMENTS

| | | | |
|---|---|---|---|
| 5,852,717 A | 12/1998 | Bhide et al. | |
| 5,870,744 A * | 2/1999 | Sprague | 707/9 |
| 6,308,273 B1 | 10/2001 | Goertzel et al. | |
| 6,363,352 B1 * | 3/2002 | Dailey et al. | 705/9 |
| 6,438,127 B1 * | 8/2002 | Le Goff et al. | 370/389 |
| 6,609,198 B1 * | 8/2003 | Wood et al. | 713/155 |
| 6,631,416 B2 * | 10/2003 | Bendinelli et al. | 709/227 |
| 6,832,322 B1 | 12/2004 | Boden et al. | |
| 6,912,582 B2 | 6/2005 | Guo et al. | |
| 6,970,471 B1 | 11/2005 | Yeh et al. | |
| 7,171,473 B1 | 1/2007 | Eftis et al. | |
| 7,260,638 B2 * | 8/2007 | Crosbie | 709/229 |
| 7,496,956 B1 | 2/2009 | Viljoen et al. | |
| 7,546,628 B2 | 6/2009 | Tsang et al. | |
| 7,577,743 B2 | 8/2009 | Fusari | |

(Continued)

OTHER PUBLICATIONS

Office Action for U.S. Appl. No. 11/465,980 dated Aug. 21, 2009.

(Continued)

Primary Examiner — Kevin C Harper
Assistant Examiner — Samina Choudhry
(74) Attorney, Agent, or Firm — Foley and Lardner LLP; Christopher J. McKenna

(57) ABSTRACT

The intranet IP address management solution of the appliance and/or client described herein provides an environment for efficiently assigning, managing and querying virtual private network addresses, referred to as intranet IP (IIP) addresses of virtual private network users, such as a multitude of SSL VPN users on an enterprise network. The appliance provides techniques and policies for assigning previously assigned virtual private network addresses of a user to subsequent sessions of the user as the user logs in multiple times or roams between access points. This technique is referred to as IIP stickiness as the appliance attempts to provide the same IIP address to a roaming VPN user. The appliance also provides a configurable user domain naming policy so that one can ping or query the virtual private network address of a user by an easily referenceable host name identifying the user. The appliance and/or client agent also provide techniques to allow applications to seamlessly and transparently communicate on the virtual private network using the virtual private network address of the user or client on the private network.

26 Claims, 11 Drawing Sheets

U.S. PATENT DOCUMENTS

| | | |
|---|---|---|
| 2002/0103931 A1 | 8/2002 | Mott |
| 2003/0041167 A1 | 2/2003 | French et al. |
| 2003/0065763 A1 | 4/2003 | Swildens et al. |
| 2003/0177389 A1 | 9/2003 | Albert et al. |
| 2003/0191848 A1 | 10/2003 | Hesselink et al. |
| 2004/0218611 A1 | 11/2004 | Kim |
| 2004/0268121 A1 | 12/2004 | Shelest et al. |
| 2005/0033858 A1 | 2/2005 | Swildens et al. |
| 2006/0005240 A1 | 1/2006 | Sundarrajan et al. |
| 2006/0090074 A1* | 4/2006 | Matoba .................. 713/171 |
| 2006/0245414 A1 | 11/2006 | Susai et al. |
| 2007/0008924 A1* | 1/2007 | Moran .................... 370/331 |
| 2007/0061887 A1 | 3/2007 | Hoover et al. |
| 2007/0245409 A1 | 10/2007 | Harris et al. |
| 2008/0034416 A1 | 2/2008 | Kumar et al. |

OTHER PUBLICATIONS

Office Action for U.S. Appl. No. 11/465,958 dated Jun. 10, 2009.
Office Action for U.S. Appl. No. 11/465,980 dated Jan. 26, 2010.
Office Action for U.S. Appl. No. 11/465,958 dated Jan. 7, 2010.
Office Action for U.S. Appl. No. 11/465,980 dated Aug. 23, 2010.
Advisory Action for U.S. Appl. No. 11/465,980 dated Apr. 15, 2010.
Office Action for U.S. Appl. No. 11/465,958 dated Jul. 8, 2010.
Office Action for U.S. Appl. No. 11/465,980 dated Oct. 24, 2011.
Final Office Action for U.S. Appl. No. 11/465,980 dated Jan. 25, 2011, 10 pages.
Non-Final Office Action for U.S. Appl. No. 11/465,980 dated May 4, 2011, 9 pages.
Notice of Allowance on U.S. Appl. No. 11/465,958 dated Mar. 2, 2012.
Office Action on U.S. Appl. No. 11/465,980 dated Mar. 27, 2012.
Notice of Allowance on U.S. Appl. No. 11/465,980 dated Dec. 17, 2012.

* cited by examiner

US 8,451,806 B2

SYSTEMS AND METHODS FOR PINGING A USER'S INTRANET IP ADDRESS

FIELD OF THE INVENTION

The present invention generally relates to data communication networks and, in particular, to systems and methods for assigning, managing, and providing Intranet Internet Protocol addresses for SSL VPN users.

BACKGROUND OF THE INVENTION

A typical computer system uses a single internet protocol (IP) address assigned to the computer system. Any user session or program on the computer will use the IP address of the computer for network communications on a TCP/IP network. Communications over the network to and from the computer, for example between a client and a server, use the computer's IP address as part of the network communications of the computer. In a virtual private network environment, a remote user may establish a virtual private network connection from a client to a second network, such as via an SSL VPN connection from a client on a public network to a server on a private network. On the second network, a second IP address is used for communications between the client and the server.

A user of the virtual private network may log in via the same computing device or roam between computing devices. For each login session, a different second IP address may be used for virtual private network communications. Also, for each computing device of the user, a different second IP address may be used for virtual private network communications. As such, the user and/or computing device of the user may be associated with different IP addresses on the virtual private network at various times. In some cases, the user may have multiple virtual private network sessions concurrently, and thus, multiple IP addresses on the private network. Identifying, tracking or managing the virtual private network addresses of remote users is challenging, and may be compounded in an environment with a multitude of remote virtual private network users. Thus, it is desirable to provide systems and methods to more efficiently manage and assign IP addresses for users of a virtual private network. It is also desirable to provide systems and methods to identify the virtual private network address assigned to a user of a virtual private network.

In one case, an application is designed and constructed to operate using the local internet protocol address of the client. When the user is connected via a virtual private network connection to a second network, the application may have issues communicating over the connection to the private network. For instance, the application may only be aware of the IP address assigned to the computer. Since it is not aware of any of the second IP addresses associated with the user or computer on the virtual private network, the application may not be able to communicate over the virtual private network connection. Thus, it is desirable to provide systems and methods to allow an application to communicate over the virtual private network connection using virtual private network IP addresses.

BRIEF SUMMARY OF THE INVENTION

The intranet IP address management solution of the appliance and/or client agent of the present invention described herein provides an environment for efficiently assigning, managing and querying virtual private network addresses, referred to as intranet IP (IIP) addresses of virtual private network users, such as a multitude of SSL VPN users on an enterprise network. The appliance provides techniques and policies for assigning previously assigned virtual private network addresses of a user to subsequent sessions of the user as the user logs in multiple times or roams between access points. This technique is referred to IIP stickiness as the appliance attempts to provide the same IIP address to a roaming VPN user. The appliance also provides a configurable user domain naming policy so that one can ping or query the virtual private network address of a user by an easily referenceable host name identifying the user. The appliance and/or client agent also provide techniques to allow applications to seamlessly and transparently communicate on the virtual private network using the virtual private network address of the user or client on the private network.

In one aspect the present invention relates to a method for assigning, by an appliance, one of a plurality of multiple intranet internet protocol addresses of a network to a user when the user accesses the network via a secure socket layer virtual private network connection (SSL VPN). The method includes the steps of: designating, via an appliance, a plurality of intranet internet protocol addresses of a first network to a user accessing the first network via a SSL VPN connection, the appliance providing SSL VPN connectivity between the first network and a client on a second network, and receiving, by the appliance, a request from the client operated by the user to establish a SSL VPN connection with the first network. In one embodiment, the appliance identifies the user via a login request to the appliance. In response to the request, the appliance assigns to the client as an internet protocol address on the first network a first intranet internet protocol address of the first user from the plurality of intranet internet protocol addresses the first intranet internet protocol address previously assigned to the first user.

In one embodiment, the method includes determining, by the appliance, the first intranet internet protocol address to assign to the user based on a policy. In some embodiments, the policy indicates to assign to the user a most recently used intranet internet protocol address of the user. In another embodiment, the method includes determining, by the appliance, a most recently used intranet internet protocol address of the user for the first intranet internet protocol address. In some embodiments, the method includes assigning to a second client of the user establishing a SSL VPN connection with the first network a next most recently used intranet internet protocol address of the user. In one embodiment, the appliance determines an inactive intranet internet protocol address from the plurality of multiple intranet internet protocol addresses as the first intranet internet protocol address.

In yet another embodiment, the method includes determining, by the appliance, the plurality of intranet internet protocol address of the user is active. In response to the determination, the appliance requests the user to transfer to a virtual private network connection of the user assigned an active intranet internet protocol address. In some embodiments, the appliance determines the plurality of intranet internet protocol address of the user is active, and in response to the determination, provides a mapped internet protocol address to the client.

In one embodiment, the method includes hosting, by the appliance, the first intranet protocol address of the client on the first network. In another embodiment, an agent on the client establishes the virtual private network connection via the appliance. In some embodiments, the method includes assigning, via the appliance, the plurality of intranet internet protocol addresses as a range of internet protocol addresses identified via a subnet mask. In one embodiment, the appliance allocates a pool of intranet internet protocol addresses to assign to a plurality of users accessing the first network via a SSL VPN connection. In some embodiments, the appliance obtains the plurality of intranet internet protocol addresses from a Domain Name Server of the first network.

In one aspect, the present invention is related to a method for responding to a request of an application for a client's network identifier with an intranet network identifier of the client on a secure socket layer virtual private network (SSL VPN) connection to a network. The method includes the step of requesting, by an application on a client, a network identifier of the client. The client is connected from a first network to a second network by a SSL VPN connection established via an appliance. The appliance assigns to the client an intranet network identifier on the second network. The method also includes intercepting, by a hooking mechanism of an agent on the client, the request; and providing, by the hooking mechanism, to the application the intranet network identifier of the client on the second network in response to the request.

In one embodiment, the method includes transmitting, by the agent, a request to the appliance for the intranet network identifier of the client on the second network, and in response to the request, transmitting, by the appliance, to the agent the intranet network identifier of the client on the second network. In another embodiment, the method includes querying, by the appliance, the intranet network identifier of the client in a routing table.

In some embodiments, the method includes establishing, by the agent, the SSL VPN connection to the second network. In other embodiments, the network identifier is an internet protocol address or a host name. In another embodiment, the method includes requesting, by the application, an internet protocol address of the client corresponding to a host name of the client.

In yet another embodiment, the method includes requesting, by the application, a socket address data structure corresponding to a host name of the client. In some embodiments, the method includes requesting, by the application, the network identifier of the client via any one of the following application programming interface calls: gethostbyname, getaddrinfo, WSAIoctl, getsockname, WSALookupService-Begin, WSALookupServiceNext, and WSALookupService-End.

In yet another embodiment, the application comprises an online collaboration tool. In some of these embodiments, the method includes establishing, by the online collaboration tool, a connection to an online collaboration environment on the second network using the intranet network identifier of the client on the second network. In one embodiment, the appliance designates a plurality of intranet internet protocol addresses for a user of the client. In some of these embodiments, the method includes assigning, by the appliance, to the client a first intranet internet protocol address from the plurality of intranet internet protocol addresses based on identification of the user of the client and/or a policy. In yet another embodiment, the method includes hosting, by the appliance, on the second network the intranet network identifier of the client.

In another aspect, the present invention is related to a system for responding to a request of an application for a client's network identifier with an intranet network identifier of the client on a secure socket layer virtual private network (SSL VPN) connection to a network. The system includes means for requesting, by an application on a client, a network identifier of the client. The client is connected from a first network to a second network by a SSL VPN connection established via an appliance. The appliance assigns to the client an intranet network identifier on the second network. The system also includes mean for intercepting, by a hooking mechanism of an agent on the client, the request; and means for providing, by the hooking mechanism, to the application the intranet network identifier of the client on the second network in response to the request.

In one aspect the present invention relates to a method for assigning, by an appliance, one of a plurality of multiple intranet internet protocol addresses of a network to a user when the user accesses the network via a secure socket layer virtual private network connection (SSL VPN). The method includes the steps of: designating, via an appliance, a plurality of intranet internet protocol addresses of a first network to a user accessing the first network via a SSL VPN connection, the appliance providing SSL VPN connectivity between the first network and a client on a second network, and receiving, by the appliance, a request from the client operated by the user to establish a SSL VPN connection with the first network. In one embodiment, the appliance identifies the user via a login request to the appliance. In response to the request, the appliance assigns to the client as an internet protocol address on the first network a first intranet internet protocol address of the first user from the plurality of intranet internet protocol addresses the first intranet internet protocol address previously assigned to the first user.

In one embodiment, the method includes determining, by the appliance, the first intranet internet protocol address to assign to the user based on a policy. In some embodiments, the policy indicates to assign to the user a most recently used intranet internet protocol address of the user. In another embodiment, the method includes determining, by the appliance, a most recently used intranet internet protocol address of the user for the first intranet internet protocol address. In some embodiments, the method includes assigning to a second client of the user establishing a SSL VPN connection with the first network a next most recently used intranet internet protocol address of the user. In one embodiment, the appliance determines an inactive intranet internet protocol address from the plurality of multiple intranet internet protocol addresses as the first intranet internet protocol address.

In yet another embodiment, the method includes determining, by the appliance, the plurality of intranet internet protocol address of the user is active. In response to the determination, the appliance requests the user to transfer to a virtual private network connection of the user assigned an active intranet internet protocol address. In some embodiments, the appliance determines the plurality of intranet internet protocol address of the user is active, and in response to the determination, provides a mapped internet protocol address to the client.

In one embodiment, the method includes hosting, by the appliance, the first intranet protocol address of the client on the first network. In another embodiment, an agent on the client establishes the virtual private network connection via the appliance. In some embodiments, the method includes assigning, via the appliance, the plurality of intranet internet protocol addresses as a range of internet protocol addresses identified via a subnet mask. In one embodiment, the appliance allocates a pool of intranet internet protocol addresses to assign to a plurality of users accessing the first network via a SSL VPN connection. In some embodiments, the appliance obtains the plurality of intranet internet protocol addresses from a Domain Name Server of the first network.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
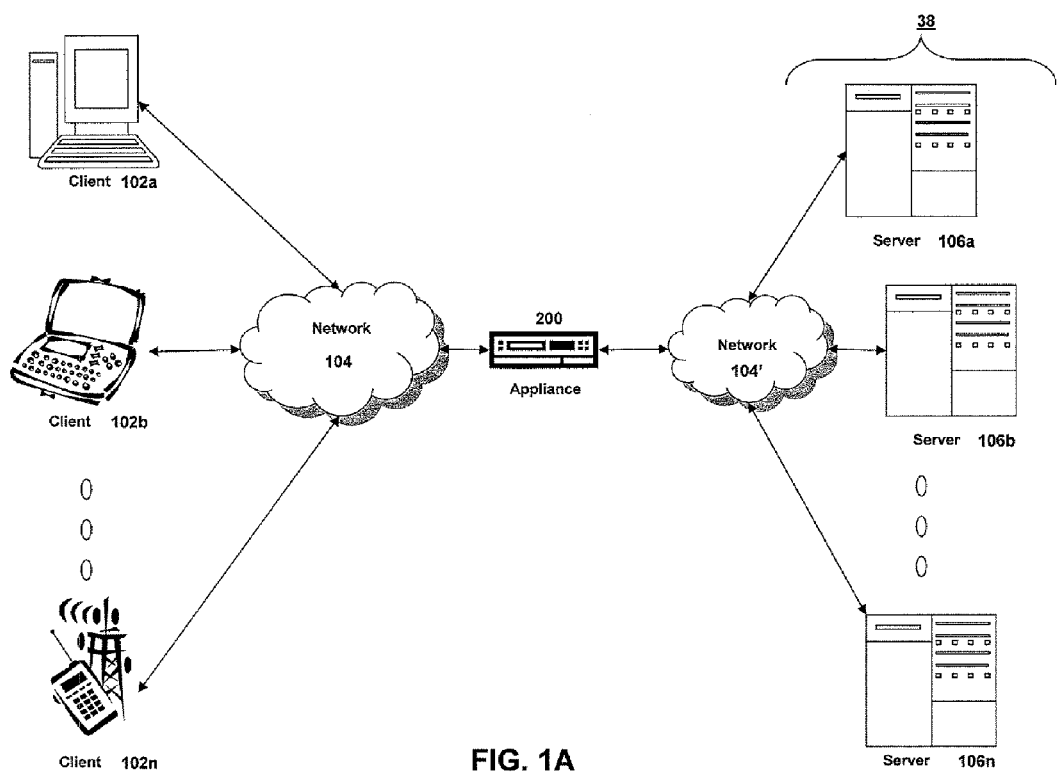
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
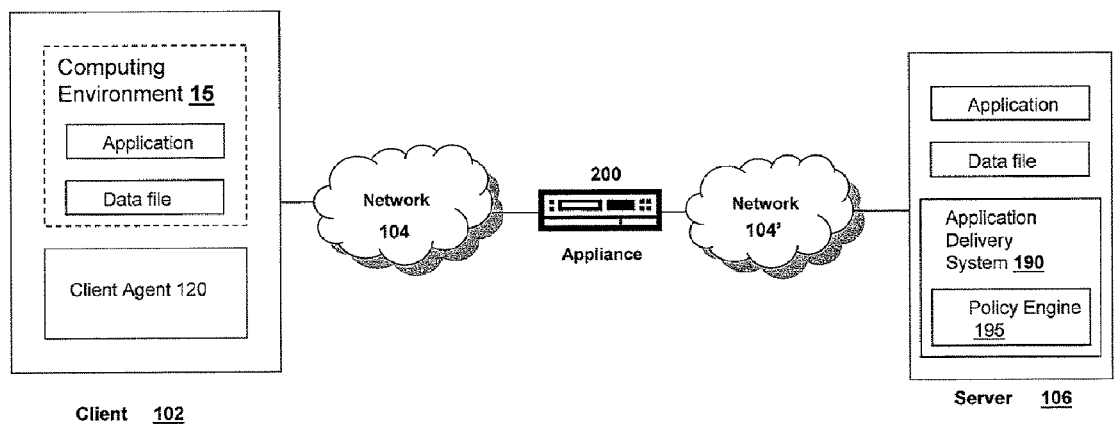
FIG. 1B is a block diagram of an embodiment of an environment for delivering a computing environment from a server to a client via an appliance.

Referring now to FIG. 1B, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft™ Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Figure 1C:
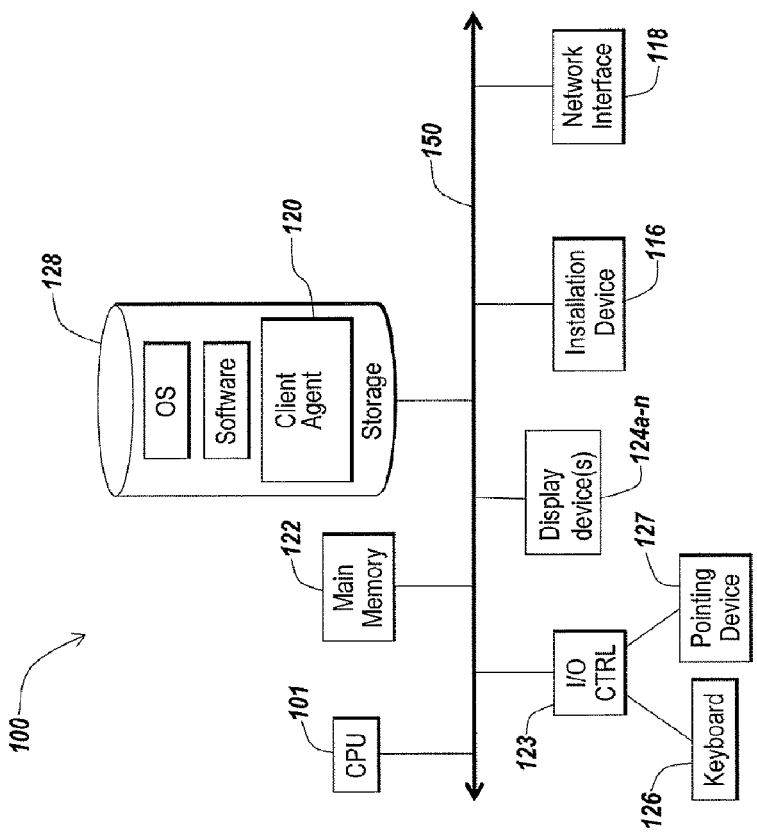
FIGS. 1C and 1D are block diagrams of embodiments of a computing device.
Figure 1D:
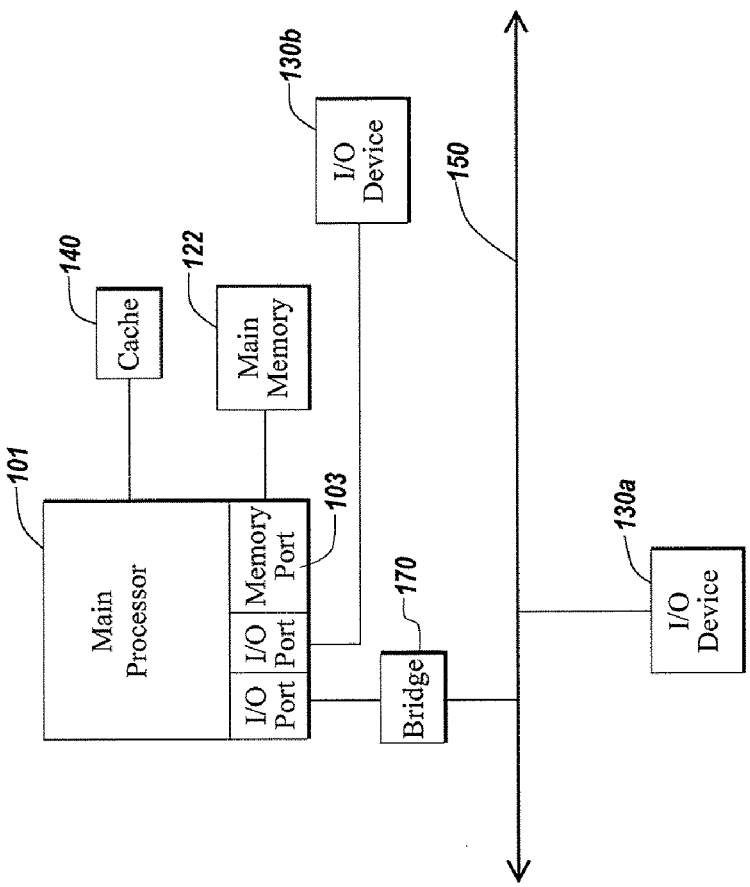

The client 102, server 106, and appliance 200 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
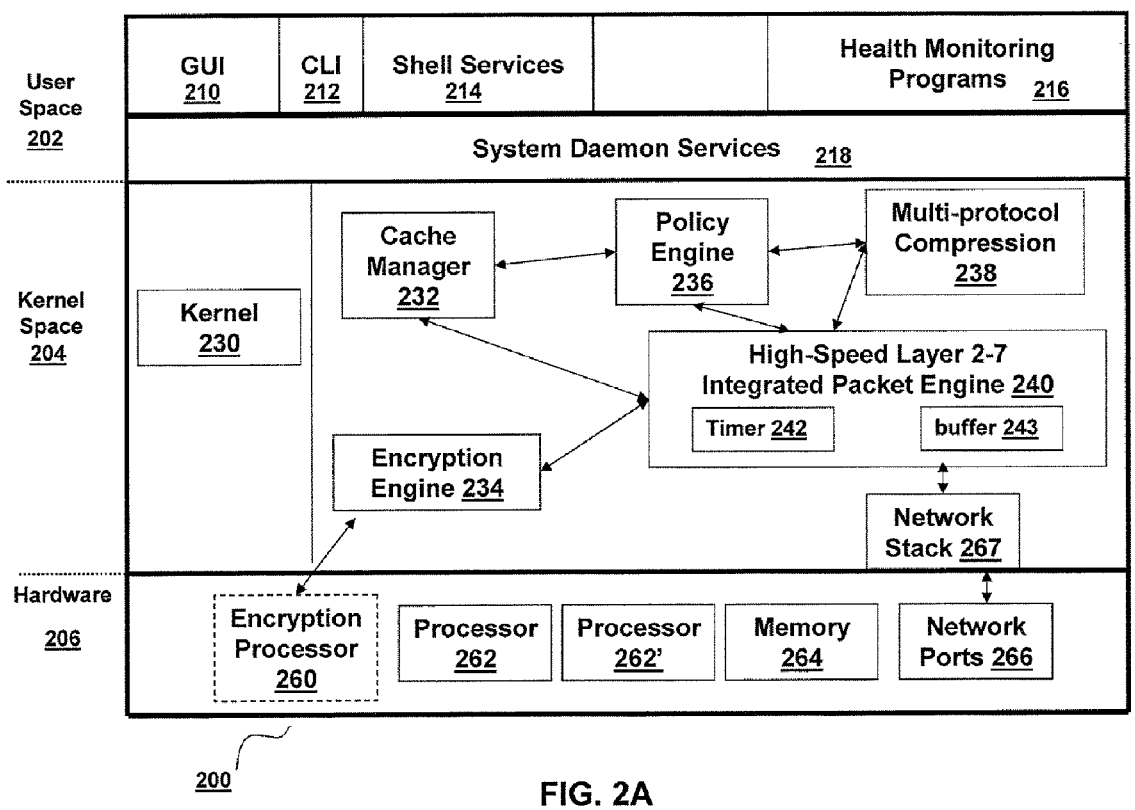
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1C and 1D. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1C and 1D. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232. sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element nat comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application (s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
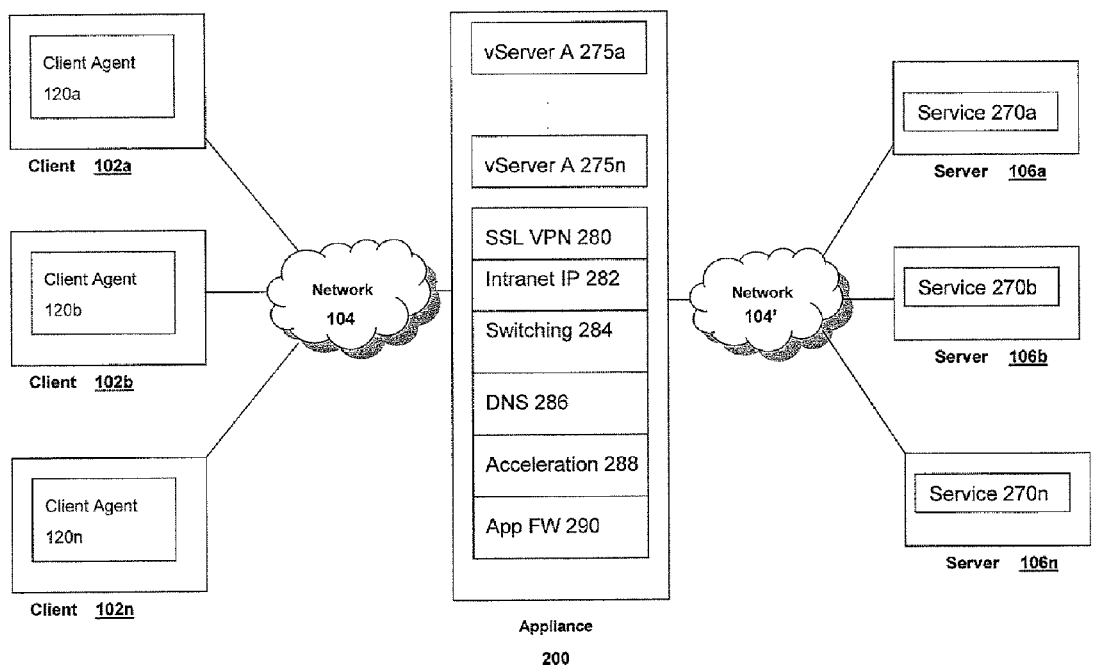
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. In one embodiment, the appliance 200 comprises any of the network devices manufactured by Citrix Systems, Inc. of Ft. Lauderdale Fla., referred to as Citrix NetScaler devices. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 120, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

C. Client Agent

Figure 3:
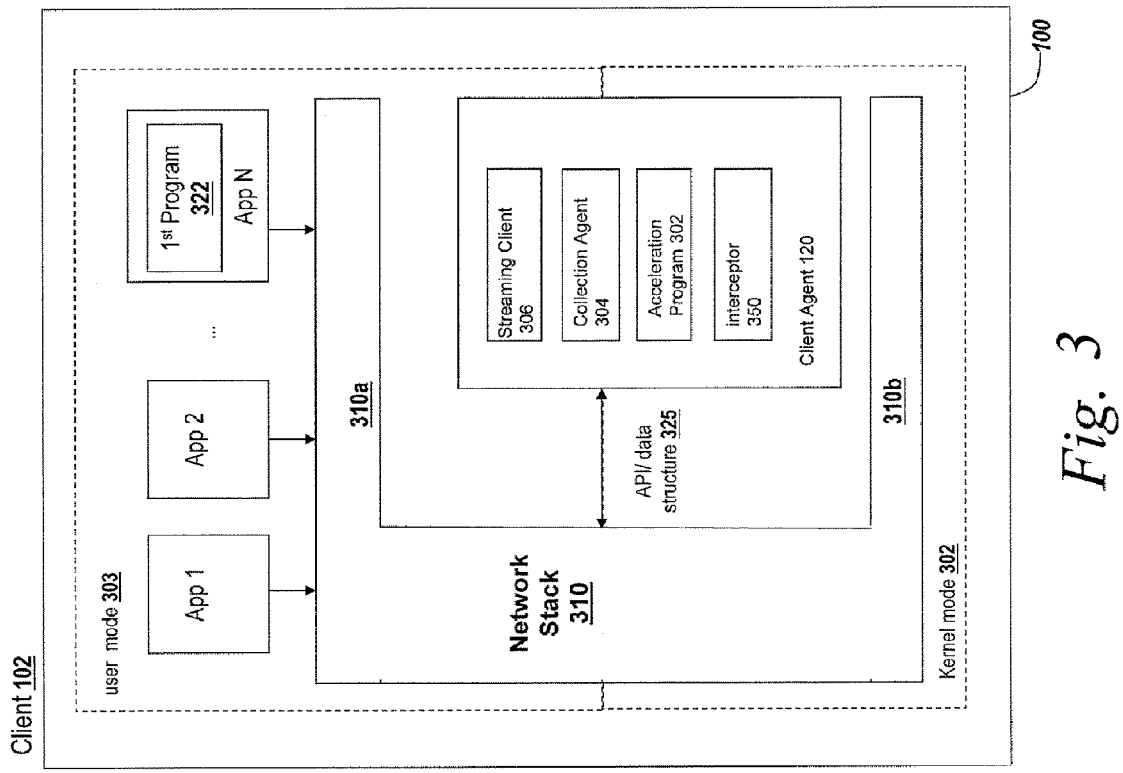
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, and/or a collection agent 304. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archives. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. IIP Addressing Environment

Figure 4:
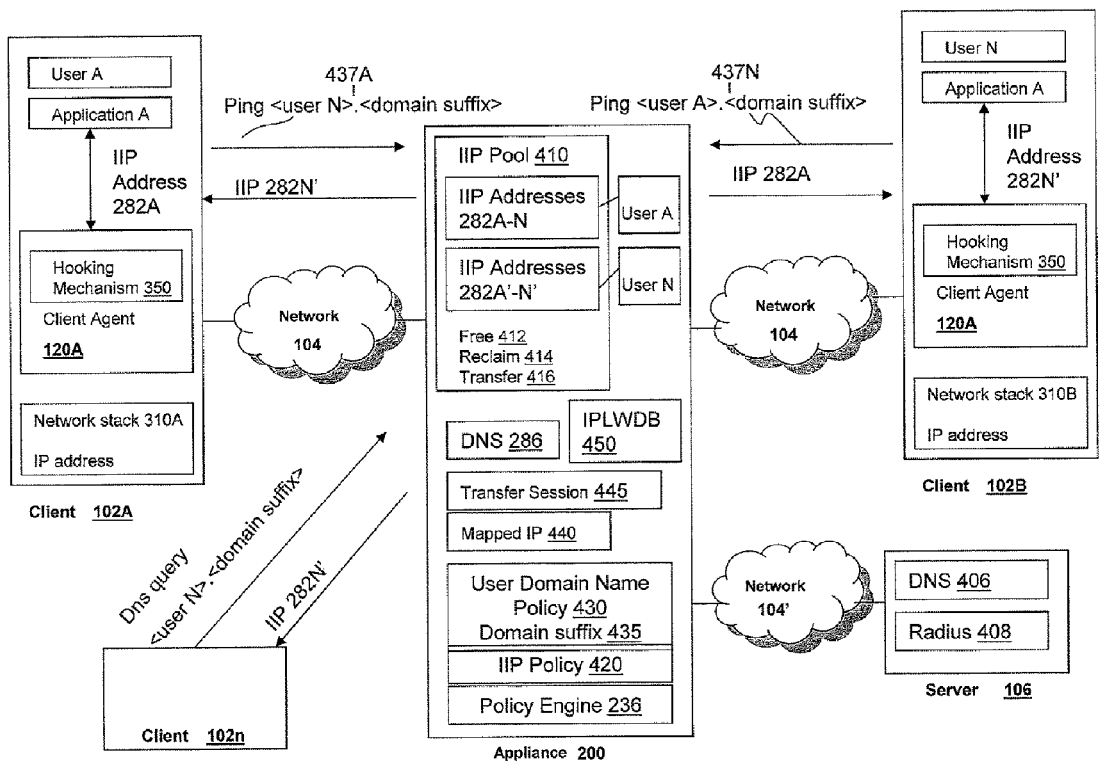
FIG. 4 is a block diagram of an embodiment of an appliance and client providing an Intranet Internet Protocol (IIP) environment.

Referring now to FIG. 4, an embodiment of an environment for providing Intranet Internet Protocol (IIP) addresses to users and/or clients is depicted. The IIP addressing environment provided by the appliance 200 and/or client 102 may be used for: 1) assigning, based on policy, temporal and/or status information, an IIP address 282 to a user from a plurality of IIP addresses designated to the user for accessing a network via the appliance, 2) providing an IIP address 282 assigned to the user to an application on a client requesting resolution of the internet protocol address of the client 102, and 3) providing a mechanism to determine the IIP address 282 assigned to the user via a configurable user domain name associated with the user's IIP address 282.

In brief overview, the appliance 200 provides an IIP pool 410 of IIP addresses 282A-282N to be assigned and/or used by one or more users. The IIP pool 410 may include a pool 412 of free or unassigned IIP addresses, i.e. a free pool 413, a pool 414 of IIP addresses that may be reclaimed, i.e., a reclaim pool 414, and/or a pool 416 of IIP addresses that may be assigned via transfer, i.e., a transfer pool 416, such as via the transfer of a session 445, e.g., a SSL VPN session provided by the appliance 200. In some embodiments, if an IIP address 282 is not available from the IIP pool 410, then a mapped IP (MIP) 440 may be used to provide a client or a user an IIP address 282. For mapped IP, the appliance 200 intercepts an incoming client's IP and replaces it with a MIP address. Any servers sitting behind the appliance 200 see a MIP instead of a the client's actual IP address in the IP header field of traffic directed to them.

A set of one or more IIP addresses 282A-282N may be designated for or associated with a user. In one embodiment, the appliance 200 via an IIP policy 420 provides a user with an IIP address from a plurality of IIP addresses 282A-282N designated for the user. For example, the IIP policy 420 may indicate to provide the user with the most recently used IIP address 282 of the user. The appliance 200 includes a database or table 450 for maintaining an association of IIP addresses 286 to entities, such as users.

In additional overview, the appliance 200 provides a mechanism for querying the IIP address 282 assigned to and/or used by the user. The appliance 200 may be configured with a user domain name policy 430 specifying a domain suffix 435 to associate with an identifier of the user. For example, the domain name policy 430 may indicate to append the domain suffix "mycompany.com" 435 to a user identifier, such as the user id of the user when logged into the appliance 200 or network 104'. As a result, in some embodiments, the appliance 200 associates the user domain name 437 of <user id>.<domain suffix>, e.g., "userA.mycompany.com" with the IIP address assigned to the user. The appliance 200 may store in the domain name service (DNS) 286, or DNS cache the user domain name 437 in association with the IIP address 282 The appliance 200 can resolve any DNS queries or ping commands based on the user domain name 437 by providing the associated IIP address 232.

In further overview, the client agent 120 provides a mechanism by which the IIP address 282 is provided to an application. The client agent 120 includes an interception or hooking mechanism 350 for intercepting any application programming interface (API) calls of the application related to determining or resolving the internet protocol address of the client 102, such as for example, gethostbyname. Instead of providing the internet protocol address of the client 102 identified in the network stack 310, e.g., the IP address of the client on network 104, the client agent 120 provides the IIP address 282 assigned to the user via the appliance 200, such as the IIP address 282 of the client 102 or user of the client 102 on the second network 104' connected from the client 102 on a first network 104 via a SSL VPN connection of the appliance.

In more detail, the appliance 200 provides an IIP address 282 to a user or the client of the user. In one embodiment, the IIP address 282 is the internet protocol address of the user, or the client used by the user, for communications on the network 104' accessed via the appliance 200. For example, the user may communicate on a first network 104 via a network stack 310 of a client 102 that provides an internet protocol (IP) address for the first network 104, such as for example, 200.100.10.1. From client 102 on the first network 104, the user may establish a connection, such as an SSL VPN connection, with a second network 104' via the appliance 200. The appliance 200 provides an IIP address 282 for the second network 104' to the client and/or user, such as 192.10.1.1. Although the client 102 has an IP address on the first network 104 (e.g., 200.100.10.1), the user and/or client has an IIP address 282 or second network IP address (e.g., 192.10.1.1) for communications on the second network 104'. In one embodiment, the IIP address 282 is the internet protocol address assigned to the client 102 on the VPN, or SSL VPN, connected network 104'. In another embodiment, the appliance 200 provides or acts as a DNS 286 for clients 102 communicating via the appliance 200. In some embodiments, the appliance 200 assigns or leases internet protocol addresses, referred to as IIP addresses 282, to client's requesting an internet protocol address, such as dynamically via Dynamic Host Configuration Protocol (DHCP).

The appliance 200 may provide the IIP address 282 from an IIP pool 410 of one or more IIP addresses 282A-282N. In some embodiments, the appliance 200 obtains a pool of internet protocol addresses on network 104' from a server 106 to use for the IIP pool 410. In one embodiment, the appliance 200 obtains an IIP address pool 410, or portion thereof, from a DNS server 406, such as one provided via server 106. In another embodiment, the appliance 200 obtains an IIP address pool 410, or portion thereof, from a Remote Authentication Dial In User Service, RADIUS, server 408, such as one provided via server 106. In yet another embodiment, the appliance 200 acts as a DNS server 286 or provides DNS functionally 286 for network 104'. For example, a vServer 275 may be configured as a DNS 286. In these embodiments, the appliance 200 obtains or provides an IIP pool from the appliance provided DNS 286.

The appliance 200 may designate, assign or allocate IIP addresses for any of the following entities: 1) user, 2) group, 3) vServer, and d) global. In some embodiments, the IIP pool 410 may be designated or used for assigning IIP addresses 286 to users. In other embodiments, IIP pool 410 may include IIP addresses 286 to be assigned to or used by services of the appliance 200, such as vServers 275. In other embodiments, IIP pool 410 may include IIP addresses 286 to be assigned to or used by global or group entities of the appliance 200. In one embodiment, the IIP pool 410 may comprise a single pool of IIP addresses. In another embodiment, the IIP pool 410 may comprise multiple pools or sub-pools of IIP addresses. In some embodiments, the IIP pool 410 comprises a free IIP pool 412. In other embodiments, the IIP pool 410 comprises a reclaimed IIP pool 414. In yet another embodiment, the IIP pool 410 comprises a transfer IIP pool 416. In some embodiments, the IIP pool 410 comprises any combination of a free IIP pool 412, a reclaimed IIP pool 414 and/or a transfer IIP pool 416. In one embodiment, the free IIP pool 413 comprises IP addresses which are available for usage. In some embodiments, the reclaimed IIP pool 414 comprises IP addresses which are associated with an entity, such as a user, group or vServer, but are inactive and available for usage. In other embodiments, the transfer IIP pool 416 comprises IP addresses that are active but can be made available through a transfer login or transfer session process.

In some embodiments, the appliance 200 may list or enumerate internet protocol addresses used for IIP addresses in the IIP pool 410, or in some embodiments, any of the sub-pools 412, 414, 416, in an order or priority. In some embodiments, the appliance 200 enumerates or lists the IIP addresses of a pool according to the following scheme: 1) user, 2) group, 3) vServer, and d) global. In one embodiment, the appliance 200 provides an IIP address from an IIP pool 410 for assignment based on the order or priority. For example, the appliance 200 may try to obtain a free IIP address from the user associated IP free pool 412 first. If an IIP address is not available from the user portion of the pool, the appliance 200 may then try to obtain a free IIP address from the group portion of the pool 412, and so on, via the vServer and global portions of the pool until an IIP address can be assigned. Likewise, the appliance 200 may prioritize the sub-pools 412, 414, and 416, in any order or combination, to search for IIP addresses to assign. For example, the appliance 200 may first search the free IIP pool 412, then the reclaimed IIP pool 416 and then the transfer IIP pool 416 for IIP addresses.

The appliance 200 may comprise any type and form of database or table 450 for associating, tracking, managing or maintaining the designation, allocation and/or assignment of IIP addresses to a 1) user, 2) group, 3) vServer, and/or d) global entities from the IIP pool 410. In one embodiment, the appliance 200 implements an Internet Protocol Light Weight Database Table (IPLWDB) 450. In some embodiments, the IPLWDB 450 maintains entries which provide a one-to-one mapping of an IP address with or to an entity. In another embodiment, once an entity uses or is assigned an IIP address 282, the IPLWDB maintains the association between the entity and IIP address, which may be referred to as "IIP stickiness" or having the IIP address "stuck" to an entity. In one embodiment, IIP stickiness refers to the ability or effectiveness of the appliance 200 to maintain or hold the association between the entity and the IIP address. In some embodiments, IIP stickiness refers to the ability or effectiveness of the appliance 200 to maintain the entity/IIP address relationship or assignment via any changes in the system, such as a user logging in and out of the appliance, or changing access points. In some embodiments, the IPLWDB 450 comprises a hash table, which is hashed based on any one or more of the 1) user, 2) group, 3) vServer, and/or d) global entities. The IPLWDB 450 may comprise a hash of the user and any other information associated with the user, such as client 102, or network 104 of client 104.

The IPLWDB 450 may track, manage or maintain any status and temporal information related to the IIP address/entity relationship. In one embodiment, the IPLWDB 450 maintains if the IIP address for the entity is currently active or inactive. For example, in some embodiments, the IPLWDB 450 identifies an IIP address 282 as active if it is currently used in an SSL VPN session via the appliance 200. In another embodiment, the IPLWDB 450 maintains temporal data for the IIP address use by the entity: such as when first used, when last used, how long has been used, and when most recently used. In other embodiments, the IPLWDB 450 maintains information on the type or source of usage, such as, in the case of user, what client 102 or network 104 used from, or for what transactions or activities were performed using the assigned IIP address.

In some embodiments, the IPLWDB 450 tracks, manages and maintains multiple IIP addresses used by an entity. The IPLWDB 450 may use one or more IIP policies 420 for determining which IIP address of a plurality of IIP addresses to assign or provide to an entity, such as a user. In one embodiment, the IIP policy 420 may specify to provide for assignment the most recently or last used IIP address of the user. In some embodiments, the IIP policy 420 may specify to provide for assignment the most used IIP address of the user. In other embodiments, the IIP policy 420 may specify to provide the least used IIP address of the user. In another embodiment, the IIP policy 420 may specify the order or priority for which to provide IP addresses of the user, for example, from the most recent to least recent. In yet another embodiment, the IIP policy 420 may specify which IIP pool 410 or sub-pool 412, 414, 416 to use, and/or in which order. In some embodiments, the IIP policy 420 may specify whether or not to use a mapped IP address, and under what conditions, such as when an inactive IIP address of the user is not available. In other embodiments, the IIP policy 420 may specify whether or not to transfer a session or login of the user, and under what conditions.

In some embodiments, the appliance 200 can be configured to bind or make the association of one or more IIP addresses 282 to an entity, such as a user. For example, in some embodiments, the associations in IPLWDB 450 are updated or maintained via bind and unbind commands via the appliance 200. In one embodiment, the following command can be issued to the appliance 200 via a command line interface (CLI) 212 or GUI 210:

bind aaa user <user-name> [-intranetip <ip_addr>] [<netmask>]

For example, if an administrator of the appliance 200 intends to associate the IIP addresses 282 of 10.102,4,189, 10.102.4.1 and 10.102.4.2 with a user "nsroot", then the administrator may issue the following commands:

bind aaa user nsroot -intranetip 10.102.4.189 255.255.255.255 bind aaa user nsroot -intranetip 10.102.4.0 255 255.255.255.252

In one embodiment, the netmask value provides a mechanism for assigning a range of IIP addresses to a user. In some embodiments, the netmask value is optional and the default is 255.255.255.255. For example, the following commands are equivalent:

bind aaa user nsroot -intranetip 10.102.4.189 bind aaa user nsroot -intranetip 10.102.4.189 255.255.255.255

Likewise, the administrator 200 or other user may disassociate an IIP address with an entity, such as a user, via an unbind command. In some embodiments, the unbind command may have similar format as the bind command. In one embodiment, if the IIP address is active, the bind or unbind command will not be processed. In other embodiments, if the IIP address is active, the appliance transmits a reset (RST) command to all the client and server connections associated with the active session, and then proceeds to make any changes associated with the issued bind or unbind command. In another embodiment, the appliance 200 updates the associated client and server connections with any updated IIP address information. In one embodiment, the appliance 200 re-establishes the associated client and server connections with the changed IIP address.

In some embodiments, the appliance 200 provides a mechanism and/or technique for determining the IIP address 282 of a user. In one embodiment, the appliance 200 is configured via a user domain name policy 430, which provides information on specifying a user domain 437. In one embodiment, the user domain policy 430 specifies a domain suffix 435 to be used in forming the user domain 437. For example, the user domain policy 430, in some embodiments, may be specified by the following command:

add vpn sessionaction <name> [-httpPort <port> . . . ] [-winsIP <ip_addr>] . . .

. . .

[-homepage <URL>] [-iipdnssuffix <string>]

In one embodiment, the iipdnssuffix 435 specifies a string, such as a domain name, that will be appended to the user id/name to form a user domain name 437. The user id may be the login name of the user, an alias or nickname of the user, or any user identification associated with the user's profile. In one embodiment, the domain suffix 435 identifies the domain name of the network 104 or network 104'. In other embodiments, the domain suffix 435 may comprise a domain name or host name of the appliance 200. In yet other embodiments, the domain suffix 435 may be any desired, predetermined or custom string for identifying the user domain name 437.

In the case of a user having multiple IIP addresses 282 active concurrently, the user domain name policy 430 may specify an instance identifier or any other character or symbol to differentiate between a first instance and a second instance of a VPN session of the user. For example, the policy 430 may specify to include a number after the user id, such as <userid><Instance Number> or <userid>_<#>. In other embodiments, the policy 430 specifies to only associate or provide a single user domain name 437 for a user. For example, in one embodiment, the user domain name 437 is associated with the first session. In other embodiments, the user domain name 437 is associated with the most recent session.

Although the user domain policy 430 is described as providing a domain suffix 435 to a user identifier to form the user domain name 437, the user domain policy 430 may specify any portion of the user domain name 437. For the example, the user domain policy 430 may specify the format for the user identifier or which type of user id to use, such as an identified portion of the user's profile. In some embodiments, by default, the domain suffix 435 may be the same domain name as the network 104. In another embodiment, the user domain policy 430 may specify a format for or additions or modifications to the domain name of the network 104 in providing the user domain name 437.

When a user logs in and gets assigned an IIP address 282, the appliance 200 stores a record associating the user id/name, or user domain name 437, and IIP address 282. In some embodiments, the appliance 200 stores the record in DNS 286, or a DNS cache, on the appliance 200. In another embodiment, the appliance 200 stores the record in a DNS 406 on server 106. In other embodiments, the appliance 200 stores the record in the IPLWDB 450. The appliance 200 can query a DNS with the user domain name 437 and obtain the assigned IIP address 286. A user logged into the appliance 200 via SSL VPN get the IIP address of another user by using DNS instead of having to remember the IP address. For example, a user on client 102 can ping the IIP address of another user. The client agent 120 can intercept such requests and query the DNS 286 of the appliance 200 to determine the IIP address 282 assigned the user domain name. In some embodiments, without logging into the appliance 200 via SSLVPN, a client can query the IIP address 282 of a user by sending a DNS query request to the DNS 286 of the appliance 200.

In some embodiments, the client agent 120 provide an interception or hooking mechanism 350 for intercepting any requests for the local IP address of the client 102, and returning or replying with an IIP address 282, such as the IIP address 282 assigned to the user. In some embodiments, the hooking mechanism 350 may include any of the mechanisms of the interceptor 350 described above in conjunction with FIG. 3. In other embodiments, the hooking mechanism 350 may include any type and form of hooking mechanism 350, such as application level hook procedure or function. In one embodiment and by way of example, the hooking mechanism 350 comprises any of the Windows API calls for setting a application hooking procedure, such as via the SetWindowsHookEx API call. In some embodiments, the SetWindowsHookEx function installs an application-defined hook procedure into a hook chain.

Depending on the operating system of the client 102, the client agent 120 may use the corresponding APIs of the OS to install, add, modify or use a hook procedure 350 to hook or intercept messages of an application. A hook procedure 350 may be installed to monitor the system for certain types of events, which are associated either with a specific thread or with all threads in the same space as the calling thread. In one embodiment, a hook, such as hooking mechanism 350, is a point in the system message-handling mechanism where an application, such as the client agent 120, can install a subroutine to monitor the message traffic in the system and process certain types of messages before the messages reach the target processing function. In some embodiments, the hooking mechanism 350 may intercept or hook any of the following function calls or messages of an application: gethostbyname, getaddrinfo, and getsockname. In other embodiments, the hooking mechanism 350 may hook any of the Windows Socket API extensions such as WSAIoctl, WSALookupServiceBegin, WSALookupServiceNext, and WSALookupServiceEnd.

In one embodiment, the client agent 120 transmits a request to the appliance 200 to determine the IIP address 282 of the host name intercepted by the hooking mechanism 350. In some embodiments, the appliance 200 looks up the corresponding IIP address 282 of the host name of the client 102 in a DNS, such as DNS 286 on appliance 200 or DNS 406 on a server. In other embodiments, the client agent 120 uses the user domain name 437 of the user associated with the application to ping or DNS query the IIP address 282. In some embodiments, the client agent 120 transmits the local IP address of the client 102 and the appliance 200 queries the corresponding IIP address 282. In one embodiment, the appliance 200 stores the name of the client 102 in association with the user and/or IIP address in the IPLWDB 450. In other embodiments, the client agent 120 has cached the IIP address of the user or client 102, and thus, does not need to query the appliance 200. For example, upon establishment of a SSL VPN connection, the appliance 200 may transmit the IIP address 282 to the client 102. With the hooking mechanism 350, instead of providing the client's local IP address (the client's address on the first network 104), the client agent 120 provides the IIP address 282 of the client (the client's or user's address on the second network 104').

In some embodiments, the hooking mechanism 350 of the client agent 120 is used to return the IIP address for supporting the transparent and seamless use of online collaboration tools via SSL VPN connections. In one embodiment, the application is a NetMeeting application manufactured by the Microsoft Corporation of Redmond, Wash. In some embodiments, any of the applications 230 may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office LiveMeeting provided by Microsoft Corporation of Redmond, Wash. With the hooking mechanism 350 providing the IIP address 282 assigned to the client via the SSL VPN connection, the application does not need to be modified to work as designed via the SSL VPN session. The hooking mechanism 350 provides the IIP address 282 of the client 102 or user if the client 102 instead of the local IP address when making a request to get the IP address of the client 102.

E. IIP Address "Stickiness" to a User

Figure 5:
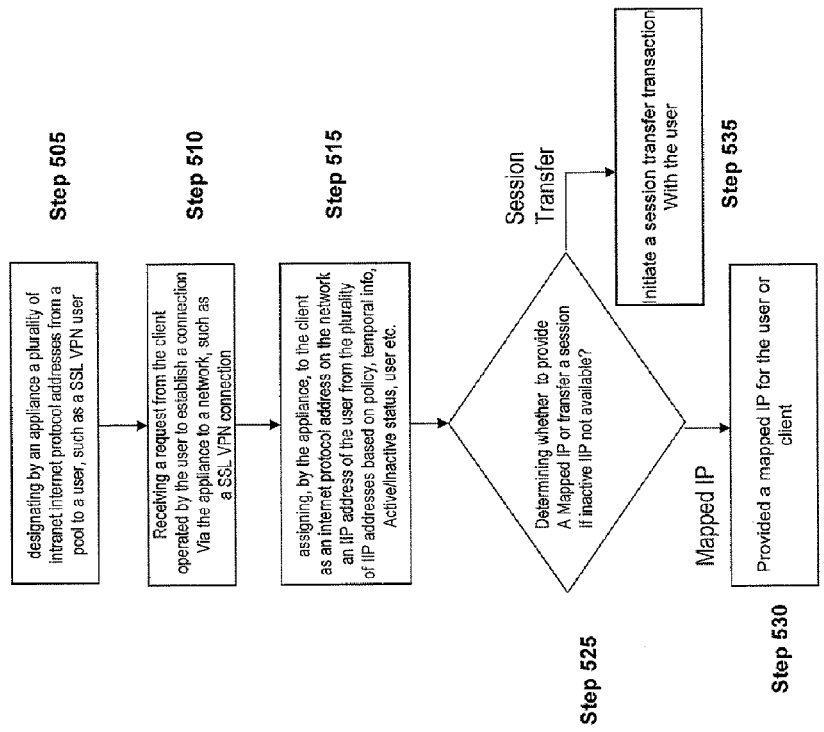
FIG. 5 is a flow diagram depicting steps of an embodiment of a method for practicing a technique for assigning an IIP address to a user.

Referring now to FIG. 5, an embodiment of steps of a method 500 for assigning an IIP address 282 to a user is depicted. In one embodiment, the method 500 is practiced to provide IIP address stickiness for a user. In some embodiments, an SSL VPN user may login and logout of the appliance 200 multiple times from different computers. For example, the user may roam from computing device to computing device or switch from one location to another. In some example, an SSL VPN user may be on a mobile device and have the network connectivity disrupted causing the device to re-establish the SSL VPN connection. With the techniques depicted by method 500, the SSL VPN user may get assigned the same IIP address 282 for each of those sessions. In some embodiments, the appliance 200 may be configured with policies 420 specifying what IIP address 282 should be assigned to a user.

In brief overview of method 500, at step 505, the appliance 200 designates a plurality of IIP address 282A-292N to a user, such as an SSL VPN user, from a pool 410 of IIP addresses. At step 510, the appliance 200 receives a request from a client 102 operated by the user to establish a connection via the appliance 200 to a network 104', such as an SSL VPN connection. At step 515, the appliance 200 assigns to the client or the user an IIP address 282 on network 104' from the IIP address pool 410. The appliance 200 may make the assignment based on policy 420, temporal information or the status of any of the designated IIP addresses 282A-282N for the user. For example, in one embodiment, the appliance 200 assigns the most recently used IIP address 282 of the user to the client 102. At step 525, in some embodiments, the appliance 200 determines whether to provide a mapped IP or to transfer a session. For example, if an inactive IIP address 282 is not available for assigning to the user, the appliance 200 may opt to use a MIP address at step 530 or to request the user to transfer an active session to the current request at step 535.

In further detail, at step 505, the appliance 200 may designate or allocate any set of one or more IIP addresses 282A-282N for a user. In some embodiments, the appliance 200 designates one IIP address 282. In other embodiments, the appliance 200 designates up to a predetermined number of multiple IIP addresses 282A-282N for the user, such as 2, 3, 4, 5, 6, 7, 9, 10, 15, 20 or 26 IIP addresses. In one embodiment, the multiple IIP addresses 282A-228N comprise a continuous range of IP addresses on network 104', for example, IP addresses 200.10.1.1 to 200.20.1.10. In another embodiment, the multiple IIP addresses 282A-282N comprises any set of IP addresses on network 104' that are not subsequent to each other. In yet another embodiment, the multiple IIP addresses 282A-282N are any combination of subsequent IP address ranges and single or separate IP addresses.

In one embodiment, the appliance 200 obtains a set of internet protocol addresses from a DNS for the network 104' accessed via the appliance 200. For example, the appliance 200 may obtain a set of IP addresses for the intranet from a DNS server 406 or a RADIUS server 508. In another example, the appliance 200 may provide or act as a DNS 286 and allocate the IP addresses for the intranet. In some embodiments, one or more IIP addresses 282A-282N may be associated or designated with a user via a bind or similar command issued at the CLI 212 or GUI 210 of the appliance 200. In other embodiments, the appliance 200 may obtain from a DNS IP addresses 282A-282N on network 104's that are associated with a user. In some embodiments, the appliance 200 designates a portion of the free IIP pool 412 to the user. In other embodiments, the appliance 200 may designate or reclaim a portion of the reclaim IIP pool 414 to the user.

At step 510, the user via client 102 transmits a request to the appliance 200 to establish a connection to the network 104'. In some embodiments, the appliance 200 identifies the user from the request. In other embodiments, the appliance 200 identifies the user from receipt of login or authentication credentials. For example, in some embodiments, the user submits a user id and password via a URL or web-page of the appliance 200. In one embodiment, the client agent 120 requests to establish a tunnel connection with the appliance 200 using any type and form of tunneling protocol. In another embodiment, the client agent 120 requests to establish a virtual private network connection via the appliance 200 to a network 104. For example, the client agent 120 may establish a virtual private network connection with the appliance 200 to connect the client 102 on the first network 104 to a second network 104'. In some embodiments, the client agent 120 establishes a SSL VPN connection with the appliance 200. In yet another embodiment, the client agent 120 establishes a tunnel or virtual private network connection using Transport Layer Secure (TLS) protocol. In one embodiment, the client agent 120 requests to establish a tunnel connection using the Common Gateway Protocol (CGP) manufactured by Citrix Systems, Inc. of Ft. Lauderdale, Fla.

At step 515, the appliance 200, in response to receiving the request from the user or the client 102, assigns an IIP address 282 on the second network 104' from the designated set of IIP addresses 282A-282N of the user. In one embodiment, the appliance 200 determines the IIP address 282 to assign based on an IIP policy 420. For example, in some embodiments to maintain IIP stickiness, the appliance 200 via IIP policy 420 determines the most recently used IIP address 282 of the user. In other embodiments to maintain IIP stickiness, the appliance 200 via information tracked by the IPLWDB 450 determines the most used IIP address 282 of the user from the set of IIP addresses 282A-282N. In some embodiments, in the case of one or more active SSL VPN sessions, the appliance 200 determines the next most recently used or most used IIP address 282 of the user. In yet other embodiments, the appliance 200 determines an appropriate, desired or policy-driven IIP address 282 to assign the user from the designated set of user IIP addresses 282A-282N by any combination of policy 435, status of sessions associated with the user's IIP addresses 282A-282N, and temporal information of sessions associated with the user's IIP addresses 282A-282N.

In one embodiment, the appliance 200 may use any sub-pool 412, 414 or 416 of the IP pool 410 to assign an IIP address 282 to the user. In some embodiment, the free IIP pool 412 may not have an available IIP address of the user. For example, all the IIP addresses of the user are marked as active or already assigned to a session. As such, in these embodiments, the appliance 200 may search the reclaim IIP pool 414 for any IIP addresses of the user assigned but available to reclaim. In still another embodiment, the appliance 200 may search the transfer IIP pool 416 for any IIP addresses of the user. In yet other embodiments, the appliance 200 may search any designated allocations or pools for group, global or vServer IIP addresses for an IP address that may be designated and assigned for the user or otherwise provided as a mapped IP address. In some embodiments, the appliance 200 searches portions of the IP pool 410 for IIP addresses of the user in an ordered or prioritized manner, such as the free IIP pool 412, first, the reclaim IIP pool 414, second and the transfer IIP pool 416 third. In one embodiment, the search order or priority may be specified by a policy 420.

In many embodiments, the appliance 200 provides a previously assigned IIP address 282 of the user from the free IIP pool 412 or the reclaim IIP pool 414. In some embodiments, the appliance 200 provides the user with the most recently or last assigned IIP address to provide IIP stickiness. However, at step 525, in some embodiments, the appliance 200 determines whether to provide a mapped IP 440 or a transfer session 445. In some embodiments, an IIP policy 420 specifies whether to use a mapped IP 440 or a transfer session 445 in cases of the appliance 200 not finding an available IIP address 282 of the user from the free IIP pool 412 and/or the reclaimed IIP pool 414. In other embodiments, an IIP policy 420 may specify to use a Mapped IP 440 in cases of the appliance 200 not finding an inactive IIP address in any pool 410, or an available IIP address in the free IIP pool 412. In one embodiment, if the IIP policy 420 specifies to use a Mapped IP 440 at step 525, then, at step 530 provides a Mapped IP 440 instead of using an assigned IIP address 272.

In the cases of using a Mapped IP 440, the appliance 200 modifies any packets to and from the client 102 with an IIP address 282 of the network 104'. For example, instead of assigning the user a user designated IIP address 282, the appliance 200 may use any available IIP address of the IIP pool 410, such as a globally available IIP address. The appliance 200 may modify the packets transmitted from the client 102 to have this mapped IP 440 when transmitted from the appliance 200 to a server 106. Also, in some embodiments, the appliance 200 may modify packets transmitted from the server 106 to the client 102 to change the Mapped IP 440 to the IP address of the client 102, such as the IP address of the client 102 on the first network 104. In some embodiments, the appliance 200 stores in the IPLWDB 450 the association of the mapped IP 440 to the user and/or client 102.

In another embodiment, if the IIP policy 420 specifies to use a transfer session 445 at step 525, then, at step 535, the appliance 200 initiates a transfer of an active session of the user. In one embodiment, upon receiving, by the appliance 200, a request from a first client operated by a user to establish a VPN session, the appliance may create a temporary VPN session with the client. In some embodiments, the appliance 200 may refuse to accept any data received via the temporary session until a new VPN session is created from temporary session. In other embodiments, the temporary VPN session may be allocated less resources by the appliance than would be allocated to a standard VPN session. In another embodiment, a temporary VPN session may not be assigned an IIP address 282, or may otherwise be prevented from receiving data. In some embodiments, the appliance may identify a number of properties associated with the existing session. In one embodiment, after identifying an existing session, the appliance 200 may transmit a message to the user via the previously existing session indicating the current session attempt.

In some embodiments, the appliance 200 may transmit to the client 102 of the user a request for information corresponding to whether to terminate the previous session. In some embodiments, this request may comprise a web page which accepts user input. For example, the web page may comprise an enumerated list of existing sessions, with input means for the user to a select one or more sessions to be terminated. In other embodiments, this request may comprise a communication to a client agent 120, which then may respond on behalf of the user. In some embodiments, this request may comprise a request for information corresponding to whether to terminate one or more of a plurality of previous sessions.

In one embodiment, the request may comprise information relating to any of the properties of the existing session. In some embodiments, this information may be displayed to the user along with the choice of whether to terminate the existing session. For example, a web page may be displayed to the user stating "you have a previously existing session which was opened July 2nd at 10:30 am, do you wish to close?" In other embodiments, this information may be transmitted to a client agent which may then make a determination whether to close a previously existing session based on the properties of the previously existing session. For example, a client agent 120 executing on the client making the new session request may determine to automatically terminate a previous session in the event that no applications are currently associated with the previous session.

In some embodiments, the request may also comprise a request for information relating to whether the user would like to transfer data from a previous session to a current session. For example, if a user was remotely executing an application, the user may wish to resume the remote execution and the previous session or sessions associated with the remote execution using the current session. After transmitting, from the appliance 200 to the client 102, a request for information corresponding to whether to terminate the previous session the appliance may receive, from the client or the user, a response comprising an indication to terminate the previous session. In still other embodiments, the appliance 200 may receive a response comprising a request to transfer data associated with a previous session to the current session. In these embodiments, the appliance 200 assigns the IIP address 282A of the previous session to the new session.

In the event the appliance 200 receives a response comprising an indication not to terminate the previous session, the appliance 200 may refuse to allow the user access, and terminate the temporary VPN session. In these embodiments, the appliance 200 maintains the association of the IIP addresses 282 with the previous session and does not assign the IIP address to the new session. In other embodiments, the appliance 200 may create a new VPN session unrelated to any of the identified previous sessions. In these embodiments, the appliance 200 may assign an available IIP address from another entity, such as group, vServer or global or another user, to the new VPN session.

F. IIP Address Spoofing of an Application

Figure 6:
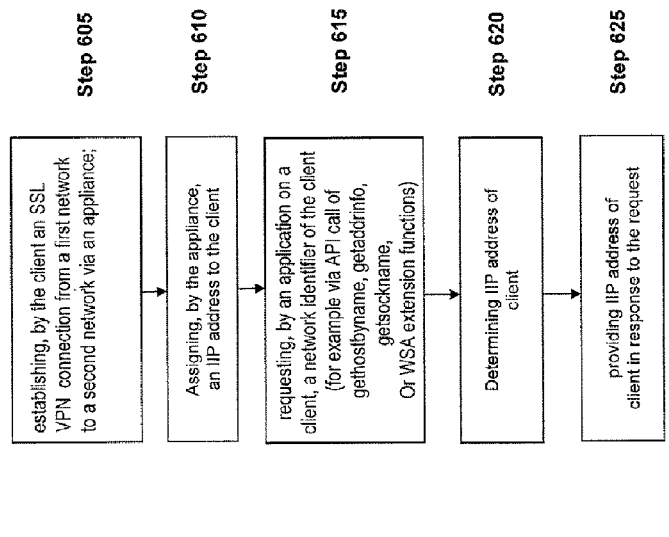
FIG. 6 is a flow diagram depicting steps of an embodiment of a method for providing the IIP address assigned to the user to an application on a client.

Referring now to FIG. 6, an embodiment of steps of a method 600 for providing an IIP address 282 to a request of an application for the local IP address of a client 102 is depicted. In one embodiment, the method 600 is practiced is referred to as IIP "spoofing" of the client's IP address. In some embodiments, spoofing is a situation in which a program successfully masquerades as another by changing data to make it look, feel and/or act as another program but with the changed data. As described herein, the client agent 120 spoofs the local IP address of the client 102 on a first network 104 to be the IIP address 282 of the client 102 or user on the second network 104' or the network 104' accessed by the client via a VPN connection to the appliance 200. With the techniques depicted by method 600, the application receives in response to a request, the IIP address 282 of the client 102 on the second network 104' instead of the local IP address on the network stack 310. In some embodiments, the method 600 enables applications to transparently and seamlessly communicate to other applications via the SSL VPN connected network 104' without changes or modification In one embodiment, this technique is useful for online collaboration tools, such as NetMeeting, when the client or user establishes an SSL VPN connection and needs to collaborate with other computers on the network 104' or other SSL VPN connected clients 102.

In brief overview of method 600, at step 605, the client 102 on a first network 104 establishes a connection via the appliance 200 to a second network 104', such as an SSL VPN connection. At step 610, the appliance 200 provides or assigns an IIP address on the second network 104' for the client 102. At step 615, an application on the client 102 requests a network identifier of the client 102. At step 620, the client agent 120 determines the IIP address 282 of the client 102 on the second network 104'. At step 625, in response to the request, the client agent 120 provides the application the IIP address 282 of the second network 104' instead of the local IP address of the client 102 on the first network 104.

In further details, at step 605, the client agent 102 establishes a transport layer connection with the appliance 200, such as via the transport control protocol or user datagram protocol. In one embodiment, the client agent 120 establishes a tunnel connection with the appliance 200 using any type and form of tunneling protocol. In another embodiment, the client agent 120 establishes a virtual private network connection via the appliance 200 to a network 104'. For example, the client agent 120 may establish a virtual private network connection with the appliance 200 to connect the client 102 on the first network 104 to a second network 104'. In some embodiments, the client agent 120 establishes a SSL VPN connection with the appliance 200. In yet another embodiment, the client agent 120 establishes a tunnel or virtual private network connection using Transport Layer Secure (TLS) protocol. In one embodiment, the client agent 120 establishes a tunnel connection with the appliance 200 using the Common Gateway Protocol (CGP) manufactured by Citrix Systems, Inc. of Ft. Lauderdale, Fla.

At step 610, the appliance 200 provides the client 102 an IP address on the second network 104'. In one embodiment, the appliance 200 assigns the client 102 an IIP address 282. In some embodiments, the appliance 200 assigns the user of the client 102 an IIP address 282 using any of the techniques and methods discussed above in connection with method 500 and FIG. 5. In another embodiment, the appliance 200 uses a Mapped IP 440 address for the client 102. In yet another embodiment, the appliance 200 and client 102 use a transferred session with its corresponding IIP address 282 for establishing the connection at step 605 and providing the IIP address 282 at step 610. In some embodiments, the appliance 200, on behalf of the client 102, hosts the IIP address 282 of the client 102 on network 104'.

At step 615, an application on the client 102 makes a request to determine the IP address of the client 102. In some embodiments, the application makes any socket based application programming interface (API) calls to request the IP address of the client based on the host name of the client 102. In one embodiment, the hooking mechanism 350 intercepts the API call. In some embodiments, the hooking mechanism 350 may intercept or hook any of the following function calls or messages of an application: gethostbyname, getaddrinfo, and getsockname. In other embodiments, the hooking mechanism 350 may hook any of the Windows Socket API extensions such as WSAIoctl, WSALookupServiceBegin, WSALookupServiceNext, and WSALookupServiceEnd. In one embodiment, without hooking these API calls via the hooking mechanism 350, the application would receive from the network stack 310 the local IP address of the client 102 on the first network 104.

At step 620, the client agent 120 and/or hooking mechanism 620 determines the IIP address 282 to return to the hooked API call. In one embodiment, the hooking mechanism 350 responds with the IIP address 282 assigned to the user. In another embodiment, the hooking mechanism 350 responds with the IIP address 282 assigned to the client 102. In other embodiments, the hooking mechanism 350 responds with the Mapped IP address 440 of the client 102 on the second network 104'. In yet another embodiment, the hooking mechanism 350 responds with the IP address on the second network 104' hosted by the appliance 200 on behalf of the client 102.

In some embodiments, the client agent 120 and/or hooking mechanism 350 transmits a request to the appliance 200 to determine the IIP address 282 of the client 102. For example, the appliance 200 may query a table or database, such as a the IPLWDB 450 to determine the IIP address associated with either the local client IP address, the user or the client agent 120. In another embodiment, the client agent 120 performs a ping command to determine the IIP address 282 associated with the user as will be described in further detail below in conjunction with FIG. 7. In some embodiments, the client agent 120 transmits a DNS query to the DNS 286 of the appliance 200 or another DNS server 406 to resolve the user domain name 437 into an IIP address 282. In yet another embodiment, the client agent 120 stores or caches the IIP address 282 assigned to the client or user from the appliance 200. In these embodiments, the client agent 120 and/or hooking mechanism 350 can retrieve the IIP address 282 from local storage without making a request to the appliance 200.

At step 625, the hooking mechanism 350 provides the IIP address 282 determined at step 620 to the application in response to the application's request at step 615. In one embodiment, the hooking mechanism 350 provides a reply to the hooked function or API call. In other embodiments, the hooking mechanism 350 provides a message to the API call. In some embodiments, the application continues operations with the provided IIP address 282. For example, the application may transmit the IIP address 282 to another client or application, such as via the payload of a transport layer packet communicated via the VPN connection. In yet other embodiments, the applications uses the IIP address 282 in other socket-based API calls as if were the local IP address of the client 102. In this manner, the application operates for the SSL VPN connected network 104's without modification as if were communicating on the first network 104'. With the techniques illustrated by the embodiment of method 600, the user, client 102 and application, such as an online collaboration tool, obtain the security and access control benefits and other functionality provided by the appliance in a seamless and transparent manner.

G. IIP Address Querying of a User

Figure 7:
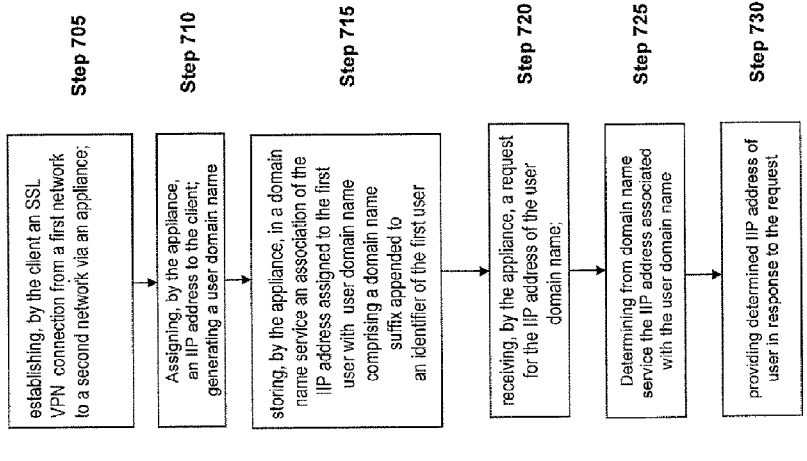
FIG. 7 is a flow diagram depicting steps of an embodiment of a method for querying the IIP address assigned to a user.

Referring now to FIG. 7, an embodiment of steps of a method 700 for querying the IIP address 282 of a user using a user domain name 437 is depicted. In one embodiment, the method 700 is practiced in order for user, client or application to determine the IIP address assigned to a SSL VPN user. In some embodiments, a naming scheme for the user domain names 437 can be configured of the appliance 200. For example, a user domain name policy 420 can specify the domain suffix 435 to be appended to a user identifier. In this manner, a user understanding the user domain naming scheme can easily and efficiently ping or DNS query the IIP address of an SSL VPN user on a network 104'. For example, the user may ping the user domain name 437 of "<user id>.<mycompanyname.com>" to determine the IIP address 282 assigned by the appliance 200 to the user or client of the user. In this manner, SSL VPN users can quickly determine the IIP addresses of other users when using collaboration tools, such as establishing a NetMeeting session between SSL VPN users.

In brief overview of method 700, at step 705, the client 102 on a first network 104 establishes a connection via the appliance 200 to a second network 104', such as an SSL VPN connection. At step 710, the appliance 200 provides or assigns an IIP address on the second network 104' for the client 102, and generates a user domain name 437 according to the user domain name policy 430. At step 715, the appliance 200 stores the user domain name 437 and IIP address association of the user in a DNS or DNS cache. At step 720, the appliance 200 receives a request for the IIP address 282 of the user based on the user domain name 437, such as via a ping command or a DNS query. At step 725, the appliance determines from the domain name service, the IIP address 282 associated with the user domain name 437. At step 730, the appliance 200 provides the determined IIP address 282 of the user in response to the request.

In further details, at step 705, the client agent 102 establishes a transport layer connection with the appliance 200, such as via the transport control protocol or user datagram protocol. In one embodiment, the client agent 120 establishes a tunnel connection with the appliance 200 using any type and form of tunneling protocol. In another embodiment, the client agent 120 establishes a virtual private network connection via the appliance 200 to a network 104'. For example, the client agent 120 may establish a virtual private network connection with the appliance 200 to connect the client 102 on the first network 104 to a second network 104'. In some embodiments, the client agent 120 establishes a SSL VPN connection with the appliance 200. In yet another embodiment, the client agent 120 establishes a tunnel or virtual private network connection using Transport Layer Secure (TLS) protocol. In one embodiment, the client agent 120 establishes a tunnel connection with the appliance 200 using the Common Gateway Protocol (CGP) manufactured by Citrix Systems, Inc. of Ft. Lauderdale, Fla.

At step 710, the appliance 200 provides the client 102 an IP address on the second network 104'. In one embodiment, the appliance 200 assigns the client 102 an IIP address 282. In some embodiments, the appliance 200 assigns the user of the client 102 an IIP address 282 using any of the techniques and methods discussed above in connection with method 500 and FIG. 5 or method 600 and FIG. 6. In another embodiment, the appliance 200 uses a Mapped IP 440 address for the client 102. In yet another embodiment, the appliance 200 and client 102 use a transferred session with its corresponding IIP address 282 for establishing the connection at step 605 and providing the IIP address 282 at step 610. In some embodiments, the appliance 200, on behalf of the client 102, hosts the IIP address 282 of the client 102 on network 104'.

At step 710, the appliance 200, in some embodiments, generates a user domain name 437 based on the user domain name policy 430. For example, in one embodiment, the appliance 200 generates a user domain name comprising a specified domain suffix 435 associated with the user identifier. In one embodiment, the domain suffix 435 comprises a domain name of the network 104' or the host name of the appliance 200. In some embodiments, any arbitrary domain suffix 435 may be specified for the user domain name 437. In other embodiments, the appliance 200 has or maintains an established user domain name 437 for the user. For example, the appliance 200 may re-associate a newly assigned IIP address 282 with the user domain name 437.

At step 715, the appliance 200 stores in a domain name service or other database, the association of the IIP address 282 of the user with the user domain name 437. In some embodiments, the appliance 200 stores a record in the DNS that maps the IIP address 282 to the user domain name 437. In one embodiment, the appliance 200 stores this record or association in the DNS 286 or DNS cache of the appliance. In other embodiments, the appliance 200 stores a record mapping the IIP address to the user domain name in another DNS, such as DNS 406. In yet another embodiment, the appliance 200 stores the IIP address/user domain name as a record or entry in the IPLWDB 450. In still other embodiments, the appliance 200 maintains the IIP address/user domain name association in memory, such as in a data structure or object, or in storage, such as in a file or cache.

At step 720, the appliance 200 receives or intercepts a request to determine the IIP address 282 of a user domain name 237. In some embodiments, the appliance 200 receives a DNS query to resolve the user domain name 237 via an SSL VPN connection client. In other embodiments, 200 receives the DNS query from any client 102 on the same 104' or different network 104 that can access the DNS 286 services of the appliance 200. In some embodiments, the appliance 200 receives the DNS query forwarded from a server 106, another DNS, or another appliance 200. In another embodiment, the appliance 200 intercepts any type and form of Internet Control Message Protocol (ICMP) request, such as a ping command, that refers to or includes the user domain name 237. In yet another embodiment, the client agent 120 intercepts the ICMP request and transmits the request to the appliance 200, such as via the SSL VPN connection of the client or a control connection between the client agent 120 and the appliance 200.

At step 725, the appliance 200 determines the IIP address 282 associated with the user domain name 438 specified via the request. In one embodiment, the appliance 200 performs a lookup in the DNS cache 286. In other embodiments, the appliance 200 transmits a DNS query request or lookup to another DNS, such as DNS 406. In some embodiments, the application 200 does a lookup in a database using the user domain name 437 as the key or index. In yet another embodiment, the application 200 performs a lookup operation in the IPLWDB 450 for the IIP address 282 associated with the user domain name 437. In some embodiments, the application 200 looks up the IIP address 282 in memory, such as via a data structure or object. In other embodiments, the application 200 determines the IIP address 282 from a cache. In still another embodiment, the appliance 200 determines the IIP address 282 from a client agent 120, for example, the client agent 120 providing the SSL VPN connection of the user identified by the user domain name 237.

At step 730, the appliance 200 provides the determined IIP address 282 of the user in response to the request of step 720. In some embodiments, the appliance 200 transmits a response to the sender of the DNS query. For example, the appliance 200 may transmit the DNS query response to a client, server, another appliance or another DNS. In other embodiments, the appliance 200 transmits a message to a client agent 120 identifying the IIP address 282. For example, in the case of the client agent 120 intercepting a ping of an SSL VPN user, the client agent 120 responds to the ping with the IIP address of the user domain name. In some embodiments, the client agent 120 also provides ping statistics along with the IIP address 282, which may have been determined and provided by the appliance 200. With the IIP address of the SSL VPN user, a user, client or application can communicate, collaborate or connect to the identified SSL VPN user.

In view of the structure, functions and operations of the system and methods described above, the appliance and client agent provide techniques for more efficiently using assigned Intranet Internet Protocol (IIP) addresses by SSL VPN users. The appliance manages and supports IIP stickiness to a user by assigning an IIP address based on policy, temporal and status information. With the configurable user domain naming scheme, the appliances provides a mechanism for users, clients and other applications to determine the IIP address assigned to a SSL VPN user. Additionally, the client agent provides a mechanism for seamlessly providing the IIP address to applications communicating via an SSL VPN connection to the private network.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed:

1. A method for determining an intranet internet protocol address assigned to a user logged into a network via a secure socket layer virtual private network connection (SSL VPN), the method comprising the steps of:
   (a) assigning, by an appliance providing access to a network, a unique intranet internet protocol address on the network to each SSL VPN session of each user of a plurality of users, the unique intranet internet protocol address from a plurality of internet protocol addresses designated to the respective user for accessing the network via the appliance, each user establishing a respective SSL VPN session via the appliance to the network, each unique intranet internet protocol address hosted by the appliance and different from an internet protocol address of a device operated by the respective user of the plurality of users, the appliance assigning the unique intranet internet protocol address to subsequent SSL VPN sessions of the respective user while the user roams from the device to another device of the respective user for connecting to the network;
   (b) storing, by the appliance, in a domain name service an association of an intranet internet protocol address assigned to an SSL VPN session of a first user of the plurality of users with a user domain name unique to the SSL VPN session of the first user, the user domain name comprising a domain name suffix appended to an identifier of the first user;
   (c) receiving, by the appliance, a request for the intranet internet protocol address of the user domain name;
   (d) determining, by the appliance, from the domain name service the intranet internet protocol address associated with the user domain name; and
   (e) providing, by the appliance, in response to the request, the intranet internet protocol address assigned to the SSL VPN session of the first user.

2. The method of claim 1, comprising identifying, by the appliance, a policy specifying the domain name suffix to append to an identifier of a user.

3. The method of claim 1, comprising configuring, by a user via the appliance, the domain name suffix of the policy.

4. The method of claim 1, wherein the domain name suffix comprises a domain name of the network.

5. The method of claim 1, comprising pinging, by a second user, the intranet internet protocol address of the first user using the user domain name.

6. The method of claim 5, wherein the second user is connected to the network via a SSL VPN connection.

7. The method of claim 1, comprising querying, by an application the domain name service, the intranet internet protocol address of the first user using the user domain name.

8. The method of claim 1, comprising assigning, by the appliance, to the first user a first intranet internet protocol address from a plurality of intranet internet protocol addresses associated with the first user.

9. The method of claim 8, comprising assigning, by the appliance, a most recently used intranet internet protocol address of the first user as the first intranet internet protocol address.

10. The method of claim 1, comprising storing, by the appliance, the user domain name associated with the intranet internet protocol address of the first user on a domain name service cache of the appliance.

11. The method of claim 1, wherein the appliance includes the domain name service.

12. A system for determining an intranet internet protocol address assigned to a user logged into a network via a secure socket layer virtual private network connection (SSL VPN), the system comprising:
  means for assigning, by an appliance providing access to a network, a unique intranet internet protocol address on the network to each SSL VPN session of each user of a plurality of users, the unique intranet internet protocol address from a plurality of internet protocol addresses designated to the respective user for accessing the network via the appliance, each user establishing a respective SSL VPN session via the appliance to the network, each unique intranet internet protocol address is hosted by the appliance and different from an internet protocol address of a device operated by the respective user of the plurality of users, the appliance assigning the unique intranet internet protocol address to subsequent SSL VPN sessions of the respective user while the user roams from the device to another device of the respective user for connecting to the network;
  means for storing, by the appliance, in a domain name service an association of the intranet internet protocol address assigned to an SSL VPN session of a first user of the plurality of users with a user domain name unique to the SSL VPN session of the first user, the user domain name comprising a domain name suffix appended to an identifier of the first user;
  means for receiving, by the appliance, a request for the intranet internet protocol address of the user domain name;
  means for determining, by the appliance, from the domain name service the intranet internet protocol address associated with the user domain name; and
  means for providing, by the appliance, in response to the request, the intranet internet protocol address assigned to the SSL VPN session of the first user.

13. The system of claim 12, comprising means for identifying, by the appliance, a policy specifying the domain name suffix to append to an identifier of a user.

14. The system of claim 12, comprising means for configuring, by a user via the appliance, the domain name suffix of the policy.

15. The system of claim 12, wherein the domain name suffix comprises a domain name of the network.

16. The system of claim 12, comprising means for pinging, by a second user, the intranet internet protocol address of the first user using the user domain name.

17. The system of claim 16, wherein the second user is connected to the network via a SSL VPN connection.

18. The system of claim 12, comprising means for querying, by an application, the domain name service, the intranet internet protocol address of the first user using the user domain name.

19. The system of claim 12, comprising means for assigning, by the appliance, to the first user a first intranet internet protocol address from a plurality of intranet internet protocol addresses associated with the first user.

20. The system of claim 19, comprising means for assigning, by the appliance, a most recently used intranet internet protocol address of the first user as the first intranet internet protocol address.

21. The system of claim 12, comprising means for storing, by the appliance, the user domain name associated with the intranet internet protocol address of the first user on a domain name service cache of the appliance.

22. The system of claim 12, wherein the appliance includes the domain name service.

23. A method for determining an intranet internet protocol address assigned to a user logged into a network via a secure socket layer virtual private network connection (SSL VPN), the method comprising the steps of:
  (a) assigning, by an appliance providing access to a network, a unique intranet internet protocol address on the network to each user of a plurality of users, the unique intranet internet protocol address from a plurality of internet protocol addresses designated to the respective user for accessing the network via the appliance, each user establishing a respective SSL VPN session via the appliance to the network, each unique intranet internet protocol address is hosted by the appliance and different from an internet protocol address of a device operated by the respective user of the plurality of users, the appliance assigning the unique intranet internet protocol address to subsequent SSL VPN sessions of the respective user while the user roams from the device to another device of the respective user for connecting to the network;
  (b) storing, by the appliance, in a domain name service an association of the intranet internet protocol address assigned to an SSL VPN session of a first user of the plurality of user with a user domain name unique to the SSL VPN session of the first user, the user domain name comprising a domain name suffix appended to an identifier of the first user;
  (c) maintaining, by the appliance, the same intranet internet protocol address for the first user while the first user roams between devices or access points for connecting to the network;
  (d) receiving, by the appliance, a request for the intranet internet protocol address of the user domain name;
  (e) determining, by the appliance, from the domain name service the intranet internet protocol address associated with the user domain name; and
  (f) providing, by the appliance, in response to the request, the intranet internet protocol address assigned to the SSL VPN session of the first user.

24. The method of claim 1, comprising assigning, via application of a policy, the unique intranet internet protocol address from the plurality of internet protocol addresses, to the respective user's SSL VPN session.

25. The method of claim 1, further comprising determining, from the plurality of internet protocol addresses, a most frequently or most recently assigned internet protocol address, to assign to the respective user's SSL VPN session.

26. The method of claim 1, further comprising determining if the unique intranet internet protocol address from the plurality of internet protocol addresses may be assigned to the respective user's SSL VPN session.

* * * * *